United States Patent
Waddington

(10) Patent No.: US 9,612,252 B2
(45) Date of Patent: Apr. 4, 2017

(54) ULTRASONIC AIRSPEED AND DIRECTION SENSOR SYSTEM

(71) Applicant: MEGGITT (UK) LIMITED, Christchurch (GB)

(72) Inventor: Alan Waddington, Farnham (GB)

(73) Assignee: Meggitt (UK) Limited, Christchurch (GB)

(*) Notice: Subject to any disclaimer, the term of this patent is extended or adjusted under 35 U.S.C. 154(b) by 235 days.

(21) Appl. No.: 14/533,794

(22) Filed: Nov. 5, 2014

(65) Prior Publication Data
US 2015/0135822 A1    May 21, 2015

(30) Foreign Application Priority Data
Nov. 18, 2013  (GB) .................................. 1320317.9

(51) Int. Cl.
| | | |
|---|---|---|
| *G01P 5/24* | (2006.01) | |
| *G01P 13/02* | (2006.01) | |
| *G01P 13/04* | (2006.01) | |

(52) U.S. Cl.
CPC ............... *G01P 5/24* (2013.01); *G01P 5/245* (2013.01); *G01P 13/02* (2013.01); *G01P 13/045* (2013.01)

(58) Field of Classification Search
None
See application file for complete search history.

(56) References Cited

U.S. PATENT DOCUMENTS

| | | | | |
|---|---|---|---|---|
| 2,699,677 A | * | 1/1955 | McCallum | G01P 5/245 318/637 |
| 3,222,926 A | * | 12/1965 | Carver | B64D 43/02 367/89 |
| 3,246,514 A | * | 4/1966 | Gremlitz | G01P 5/04 324/71.1 |
| 3,633,415 A | * | 1/1972 | Luce | G01F 1/667 73/170.13 |

(Continued)

FOREIGN PATENT DOCUMENTS

| | | |
|---|---|---|
| CN | 201984080 U | 9/2011 |
| CN | 102269769 | 12/2011 |

OTHER PUBLICATIONS

European Search Report for Application Patent No. EP 14 18 1304 mailed Apr. 22, 2015, 3 pages.

*Primary Examiner* — Jill Culler
(74) *Attorney, Agent, or Firm* — Kilpatrick Townsend & Stockton LLP

(57) ABSTRACT

An ultrasonic airspeed and direction sensor system comprising an ultrasonic sensor array including an elongate base member for mounting to a vehicle, such as a helicopter, so as to extend outwardly from the vehicle. A number of radially extending support members are connected to the base member. The support members carry ultrasonic transducers arranged to define at least four bidirectional ultrasonic paths between respective pairs of the transducers, the ultrasonic paths being arranged into at least three non-coplanar sets. A processing system monitors the passage of ultrasonic signals along the paths to generate corresponding time of flight data, making a weighted selection containing at least one path from each of at least three sets, and processing the time of flight data for the selected paths, proportionate to the determined weighting, to generate airspeed and direction information.

23 Claims, 4 Drawing Sheets

(56) References Cited

U.S. PATENT DOCUMENTS

| | | | |
|---|---|---|---|
| 4,031,756 A | | 6/1977 | Rotier et al. |
| 4,038,870 A | | 8/1977 | Rotier |
| 4,262,545 A | * | 4/1981 | Lamarche ............... G01P 5/247 |
| | | | 367/117 |
| 4,391,136 A | * | 7/1983 | Perkins ................... G01P 5/248 |
| | | | 73/170.08 |
| 4,829,441 A | * | 5/1989 | Mandle .................... G01P 5/24 |
| | | | 244/17.13 |
| 4,890,488 A | | 1/1990 | Pincent et al. |
| 5,343,744 A | | 9/1994 | Ammann |
| 6,601,447 B1 | * | 8/2003 | Loucks ................. G01P 5/248 |
| | | | 73/170.11 |
| 8,866,322 B2 | * | 10/2014 | Tchoryk, Jr. .............. G01P 5/26 |
| | | | 290/44 |
| 2011/0043786 A1 | | 2/2011 | Lacondemine et al. |

\* cited by examiner

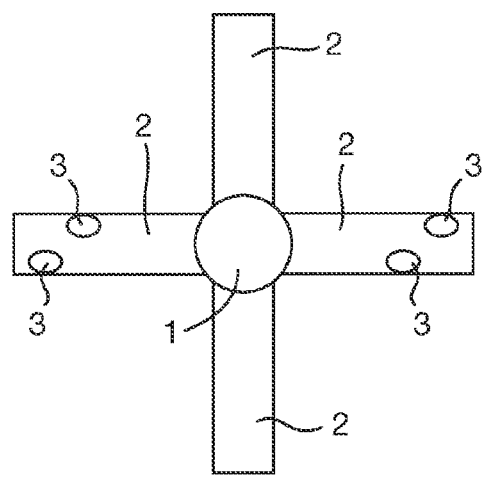
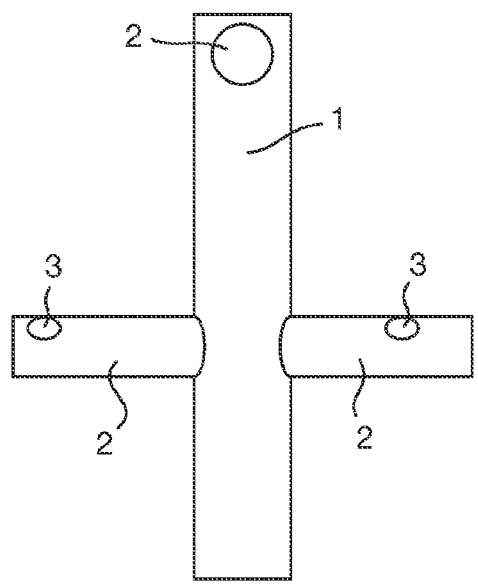
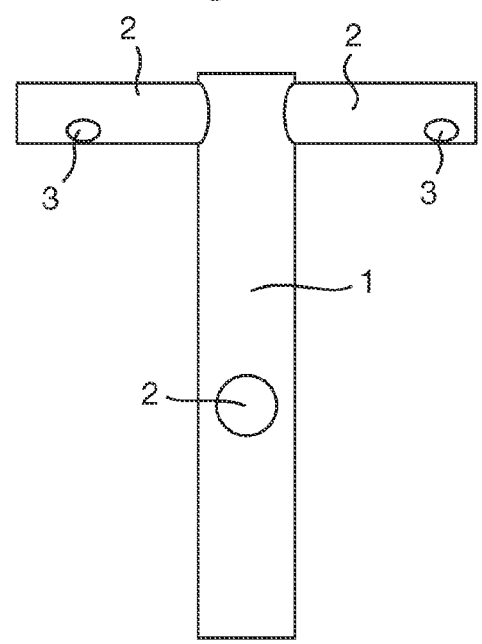

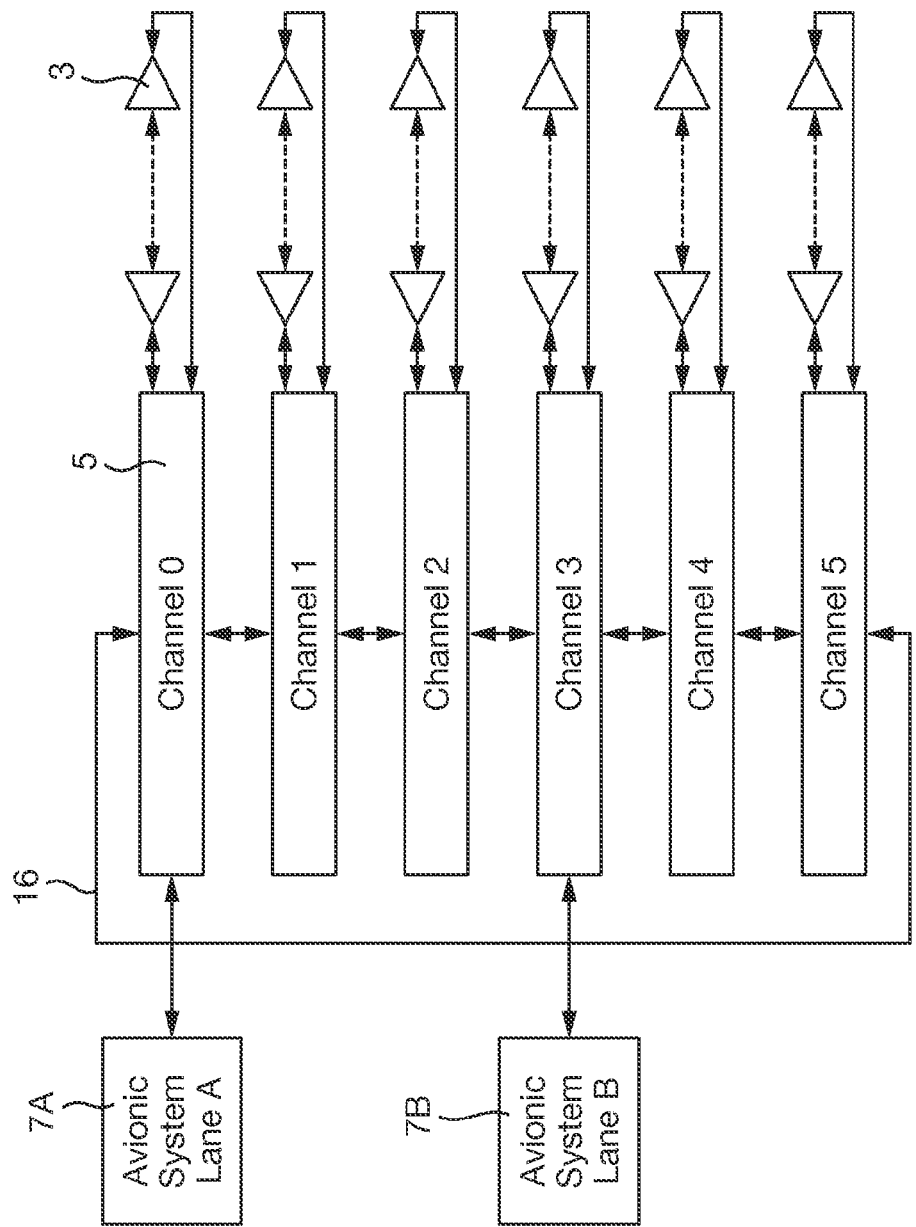

ULTRASONIC AIRSPEED AND DIRECTION SENSOR SYSTEM

CROSS-REFERENCES TO RELATED APPLICATIONS

The present application is a non-provisional of and claims priority of application No. 1320317.9 (GB), filed Nov. 18, 2013, which is incorporated herein by reference in its entirety for all purposes.

BACKGROUND OF THE INVENTION

The invention relates to an ultrasonic airspeed and direction sensor system and in preferred embodiments relates to such a system for mounting to a vehicle such as an aircraft. Provision of airspeed and direction improves pilot situational awareness and enhances aircraft fatigue monitoring.

One example of a known sensor for use with aircraft is described in U.S. Pat. No. 4,031,756. In this, a base supporting element is mounted to the front of the aircraft such as a helicopter and includes a central arm on which are mounted three transmitting transducers and surrounding the transmitter support are provided three receiver transducer housings incorporating receiving transducers, one of those housings including a further receiver transducer. Ultrasonic signals are transmitted from the transmitting transducers to the receiving transducers along respective paths and the speed and direction of air flow can be determined.

One of the problems with this known sensor is that it has to be made very robust to minimize vibration errors and therefore has large supporting members in order to reduce vibration but this then limits the directions of air flow that can be monitored. Particularly, if the aircraft is moving in a direction a little different from a forward direction, parts of the body of the sensor will occlude air flow resulting in erroneous measurements.

SUMMARY OF THE INVENTION

In accordance with the present invention, an ultrasonic airspeed and direction sensor system comprises an ultrasonic sensor array including an elongate base member for mounting to a vehicle in use so as to extend outwardly from the vehicle, a number of radially extending support members connected to the base member, the support members carrying ultrasonic transducers arranged to define at least four bidirectional ultrasonic paths between respective pairs of the transducers, the ultrasonic paths being arranged into at least three non-coplanar sets; and a processing system for monitoring the passage of ultrasonic signals along the paths to generate corresponding time of flight data, making a weighted selection containing at least one path from each of at least three sets, and processing the time of flight data for the selected paths, proportionate to the determined weighting, to generate airspeed and direction information.

In this invention, we reduce the problem of the effect due to the support structure by providing at least four bidirectional ultrasonic paths of which at least three are non-coplanar and then select from the resultant monitored signals those which at any point contribute best to a determination of airspeed and direction. At least three non-coplanar paths are required to allow a three dimensional air flow vector to be derived from the available linear airspeed measurements.

This selection can be achieved in a variety of ways and in a very simple embodiment could involve monitoring the correlation of the received and transmitted signals and selecting the three best correlated non-coplanar signal paths, which will be those that are the least affected by turbulent occluded air flow. In more sophisticated examples, the processing system is adapted to apply weights in accordance with a Least Squares fit algorithm where the weighting for each measurement is one of: a function of the measurement variance; a function of an initial estimate of air flow direction, based on a Least Squares fit of all valid data; and a function of previously determined air flow direction.

Preferably, any parallel ultrasonic paths within each set are offset circumferentially about the base member. With this arrangement, it is more likely that at least one of the parallel ultrasonic paths within a set can be given a significant weighting and contribute to the overall measurement. Where two ultrasonic paths reside within a set, this is improved if these ultrasonic paths are located on opposite sides of the base member.

Preferably, the radially extending support members are arranged in two groups, the members of one group extending from a first position along the base member and the members of the other group extending from another, different position along the base member. The members of each group may be equiangularly spaced around the base member although this is not essential. In a particularly preferred embodiment, each member of one group extends between respective members of the other group when viewed in plan.

As mentioned above, the invention is particularly applicable for use with vehicles such as aircraft and in particular helicopters.

BRIEF DESCRIPTION OF THE DRAWINGS

Some examples of ultrasonic airspeed and direction sensor systems according to the invention will now be described with reference to the accompanying drawings, in which:

FIGS. 2A-2C are plan, front and side elevations of a second embodiment;

FIG. 5 illustrates the primary electrical components of a six channel, multiple redundant, fail-operative system architecture embodiment.

DESCRIPTION OF THE PREFERRED EMBODIMENTS

Figure 1A:
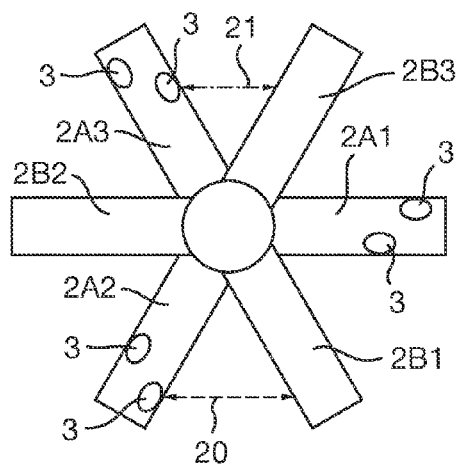
FIGS. 1A-1C are plan, front and side elevations respectively of a first embodiment.
Figure 1B:
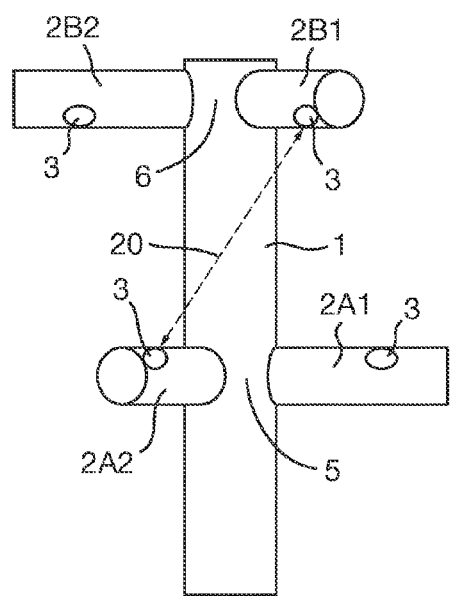
Figure 1C:
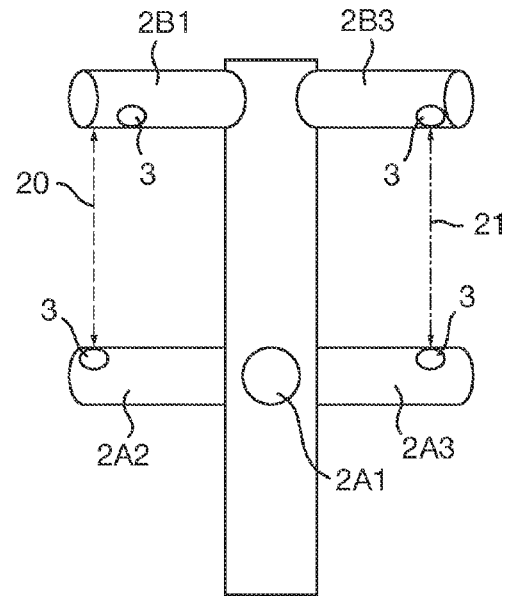

FIGS. 1A-1C illustrate a three-dimensional ultrasonic airspeed and direction sensor, embodied as a single sensor assembly, intended for use on helicopter platforms. The supporting structure comprises a hub or elongate base member 1, which is typically attached to the helicopter via a boom, and a set of spokes or radially extending support members 2. The spokes 2 are arranged in two groups of three spokes 2A1-2A3 and 2B1-2B3, the spokes of each group being equiangularly spaced about the axis of the hub 1. The group of spokes 2A1-2A3 extend from a point 5 along the axis of the hub 1 while the spokes of the second group 2B extend from a point 6 spaced from the point 5 along the axis of the hub 1. It will be noted From FIG. 1A that the spokes of one group extend between the spokes of the other group when viewed in plan and so the ultrasonic paths define a regular weave pattern around the hub 1.

Each spoke 2 supports a pair of bidirectional transducers 3. Each transducer 3 on one spoke 2 is directed towards a corresponding transducer 3 on the nearest spoke of the other group to define a bidirectional ultrasonic path between them. One such path is shown in FIG. 1 by a line 20.

Each ultrasonic path extends between pairs of transducers 3 which are equally radially spaced from the axis of the hub 1. However, since each spoke carries a pair of transducers 3 at different radial distances, adjacent ultrasonic paths will be offset radially with respect to one another. Thus, the twelve transducers form two redundant sets of three non-coplanar propagation paths between transducer pairs. The redundancy allows accuracy to be maintained when structurally generated vortices adversely affect up to one of each redundant parallel propagation path. An example of the parallel redundant paths is shown in FIG. 1 by lines 20 and 21.

FIG. 2 is an alternative embodiment of a three-dimensional ultrasonic airspeed and direction sensor, intended for use on helicopter platforms. The supporting structure comprises a hub 1, which is typically attached to the helicopter via a boom, and a set of four spokes 2, each of which supports two ultrasonic transducers 3. The spokes 2 are arranged in two axially spaced groups as in FIG. 1. The eight transducers form a skewed set of four propagation paths between transducer pairs. Any three of the four propagation paths form a non-coplanar set. This redundancy allows accuracy to be maintained when structurally generated vortices adversely affect one of the propagation paths.

Figure 4:
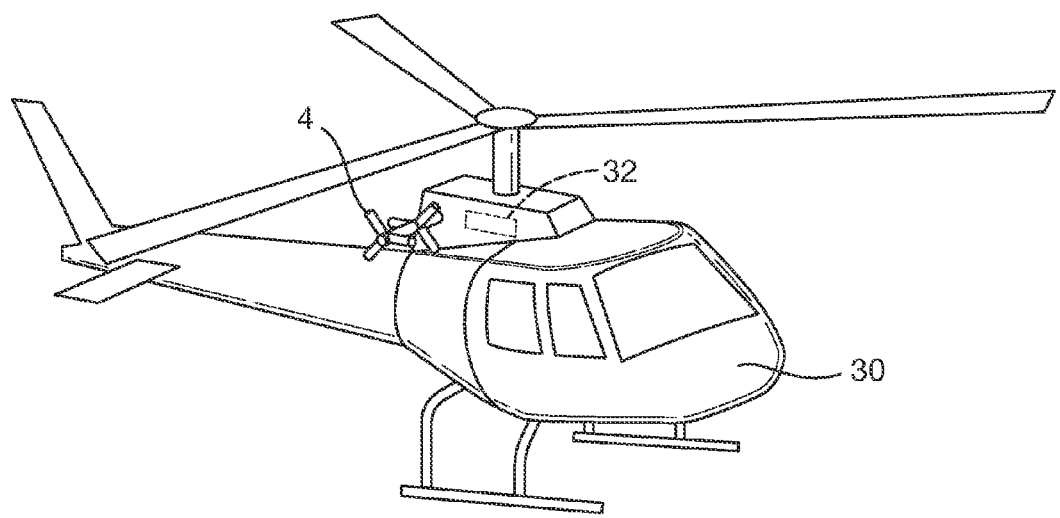
FIG. 4 illustrates the embodiment of FIG. 1 attached to a helicopter.

FIG. 4 shows a helicopter 30 fitted with a single ultrasonic airspeed and direction sensor 4 of FIG. 1. More than one sensor may be fitted. A suitably programmed processor 32 is coupled to the transducers 3 to process the resulting signals. Flight test data is used to determine and calibrate the relationship between the set of measured local flow angles and the freestream angles of attack and sideslip.

Figure 3:
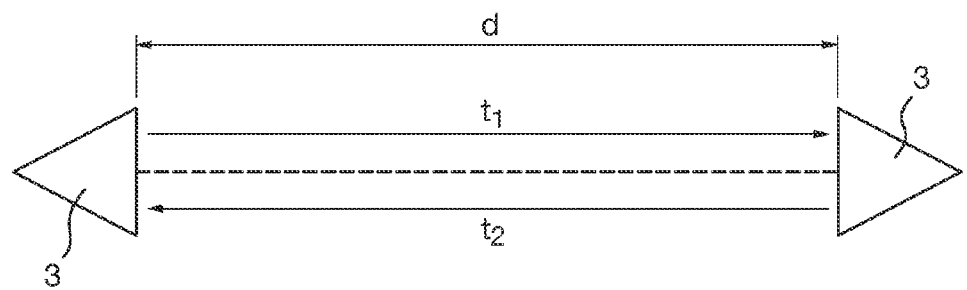
FIG. 3 illustrates a pair of transducers and an intervening ultrasonic path.

FIG. 3 shows a single measurement channel comprising of two ultrasonic transducers 3, which form a single, bidirectional ultrasonic beam path. Time of flight $t_1$ and $t_2$ are measured in opposing directions and the true air velocity v along a propagation path of length d is calculated according to:

$$v = \frac{(t_2 - t_1)d}{2(t_2 t_1)}$$

Air velocity in two dimensions can be determined using at least two non-parallel measurement paths, whilst air velocity in three dimensions can be determined using at least three non-coplanar measurement paths. Measurement data is combined, for example, using a Weighted Least Squares fit, where the weighting for each measurement may be: a function of the measurement variance; a function of an initial estimate of air flow direction, based on a Least Squares fit of all valid data; or a function of previously determined air flow direction.

Weightings are chosen so as to equalise the magnitude of the measurement variances and are therefore inversely proportional to said variances. They are either calculated in real time directly from the measurements, or alternatively looked up in a table indexed by the estimated air flow direction. The values in the table are based on experimental wind tunnel data or computational fluid dynamics simulation data.

The three dimensional air flow velocity $\hat{x}$ is calculated from the vector of measured path velocities v, the physical geometry system matrix H, where v=Hx, and the diagonal weightings matrix W according to:

$$\hat{x} = (H^T W H)^{-1} H^T W v$$

FIG. 5 is an embodiment of a six channel, multiple redundant, fail-operative system architecture embodied in the processor 32. The system comprises a number of channels 5, each measuring transit time bi-directionally over the propagation path between a respective pair of transducers 3. Multiple redundant communication paths 16 ensure that in the event of a failure, all available measurement data can be routed over multiple redundant interfaces to external systems 7A and 7B. Each channel may also calculate derived air data parameters from the available measurement data and redundantly provide it to the external systems.

Although the description has utilized transducers which can both receive and transmit, it would be possible to utilize pairs of transmitting and receiving transducers in place of a single bidirectional transducer although this is much less preferred as the paths between opposed receiving and transmitting transducers will not be exactly the same.

As far as timing of the signals is concerned, it is preferred to activate the transducer pairs in sequence around the circumference of the hub 1 so as to minimize interference. Typically, the transducers are sequentially activated at a frequency of about 300 Hz while the preferred ultrasonic frequency is about 235 kHz. By repeating the measurement over many cycles through all the paths, it is possible to reduce errors due to vibration but it is preferred to utilize transmitted frequencies which are substantially different from the natural resonant frequency of the sensor system itself.

Once the processing system has determined air speed and direction, this can be displayed or otherwise used in a conventional manner.

The invention claimed is:

1. An ultrasonic airspeed and direction sensor system comprising an ultrasonic sensor array including an elongate base member for mounting to a vehicle in use so as to extend outwardly from the vehicle, a number of radially extending support members connected to the base member, the support members carrying ultrasonic transducers arranged to define at least four bidirectional ultrasonic paths between respective pairs of the transducers, the ultrasonic paths being arranged into at least three non-coplanar sets; and a processing system for monitoring the passage of ultrasonic signals along the paths to generate corresponding time of flight data, making a weighted selection containing at least one path from each of at least three sets, and processing the time of flight data for the selected paths, proportionate to the determined weighting, to generate airspeed and direction information, wherein the radially extending support members are arranged in two groups, the members of one group extending from a first position along the base member and the members of the other group extending from another, different position along the base member.

2. An ultrasonic airspeed and direction sensor according to claim 1, comprising at least four non-co-planar ultrasonic paths.

3. An ultrasonic airspeed and direction sensor according to claim 1, comprised of six ultrasonic paths, arranged to form three non-co-planar sets of two parallel ultrasonic paths.

4. A sensor according to claim 3, wherein the parallel ultrasonic paths of each set are offset circumferentially about the base member.

5. A sensor system according to claim 4, wherein the parallel ultrasonic paths in each set are located on opposite sides of the base member.

6. A sensor system according to claim 3, wherein the ultrasonic transducers are arranged such that one ultrasonic path of each set of two parallel ultrasonic paths extends between ultrasonic transducers at a first radial distance from the base member and the other ultrasonic path of each set extends between ultrasonic transducers at a second, different radial difference from the base member.

7. A sensor system according to claim 1, wherein the radially extending support members of each group are substantially equiangularly spaced around the base member.

8. A sensor system according to claim 7, wherein each member of one group extends between respective members of the other group when viewed in plan.

9. A sensor system according to claim 1, wherein each bidirectional ultrasonic path extends from a radially extending support member of one group to a corresponding radially extending support member of the other group.

10. A sensor system according to claim 1, wherein the processing system is adapted to apply weights in accordance with a Least Squares fit algorithm where the weighting for each measurement is one of: a function of the measurement variance; a function of an initial estimate of air flow direction, based on a Least Squares fit of all valid data; and a function of previously determined air flow direction.

11. A sensor system according to claim 1, wherein the processing system is adapted to apply weights dependent on the amplitude of the received ultrasonic signals.

12. A vehicle, such as an aircraft, to an external surface of which an elongate base member of a sensor system is mounted, the sensor system comprising an ultrasonic sensor array including an elongate base member for mounting to a vehicle in use so as to extend outwardly from the vehicle, a number of radially extending support members connected to the base member, the support members carrying ultrasonic transducers arranged to define at least four bidirectional ultrasonic paths between respective pairs of the transducers, the ultrasonic paths being arranged into at least three non-coplanar sets; and a processing system for monitoring the passage of ultrasonic signals along the paths to generate corresponding time of flight data, making a weighted selection containing at least one path from each of at least three sets, and processing the time of flight data for the selected paths, proportionate to the determined weighting, to generate airspeed and direction information, wherein the radially extending support members are arranged in two groups, the members of one group extending from a first position along the base member and the members of the other group extending from another, different position along the base member.

13. A vehicle according to claim 12, wherein the sensor comprises at least four non-co-planar ultrasonic paths.

14. A vehicle according to claim 12, wherein the ultrasonic airspeed and direction sensor is comprised of six ultrasonic paths, arranged to form three non-co-planar sets of two parallel ultrasonic paths.

15. A vehicle according to claim 14, wherein the parallel ultrasonic paths of each set are offset circumferentially about the base member.

16. A vehicle according to claim 15, wherein the parallel ultrasonic paths in each set are located on opposite sides of the base member.

17. A vehicle according to claim 14, wherein the ultrasonic transducers are arranged such that one ultrasonic path of each set of two parallel ultrasonic paths extends between ultrasonic transducers at a first radial distance from the base member and the other ultrasonic path of each set extends between ultrasonic transducers at a second, different radial difference from the base member.

18. A vehicle according to claim 12, wherein the radially extending support members of each group are substantially equiangularly spaced around the base member.

19. A vehicle according to claim 18, wherein each member of one group extends between respective members of the other group when viewed in plan.

20. A vehicle according to claim 12, wherein each bidirectional ultrasonic path extends from a radially extending support member of one group to a corresponding radially extending support member of the other group.

21. A vehicle according to claim 12, wherein the processing system is adapted to apply weights in accordance with a Least Squares fit algorithm where the weighting for each measurement is one of: a function of the measurement variance; a function of an initial estimate of air flow direction, based on a Least Squares fit of all valid data; and a function of previously determined air flow direction.

22. A vehicle according to claim 12, wherein the processing system is adapted to apply weights dependent on the amplitude of the received ultrasonic signals.

23. A vehicle according to claim 12, the vehicle being a helicopter.

* * * * *